United States Patent
Wee et al.

(10) Patent No.: US 9,759,592 B2
(45) Date of Patent: Sep. 12, 2017

(54) METHOD AND APPARATUS FOR WET GAS FLOW MEASUREMENTS AND MEASUREMENT OF GAS PROPERTIES

(75) Inventors: Arnstein Wee, Oslo (NO); Ingve Morten Skjaeldal, Hafrsfjord (NO)

(73) Assignee: FMC KONGSBERG SUBSEA AS, Kongsberg (NO)

( * ) Notice: Subject to any disclaimer, the term of this patent is extended or adjusted under 35 U.S.C. 154(b) by 537 days.

(21) Appl. No.: 13/139,427

(22) PCT Filed: Dec. 14, 2009

(86) PCT No.: PCT/NO2009/000432
§ 371 (c)(1),
(2), (4) Date: Aug. 23, 2011

(87) PCT Pub. No.: WO2010/068118
PCT Pub. Date: Jun. 17, 2010

(65) Prior Publication Data
US 2011/0301877 A1 Dec. 8, 2011

(30) Foreign Application Priority Data
Dec. 12, 2008 (NO) .................... 20085198

(51) Int. Cl.
*G01F 1/74* (2006.01)
*G06F 17/18* (2006.01)
(Continued)

(52) U.S. Cl.
CPC .............. *G01F 1/74* (2013.01); *G01F 1/363* (2013.01); *G01F 1/88* (2013.01); *G01F 15/022* (2013.01)

(58) Field of Classification Search
CPC ..... G01F 1/00; G01F 7/00; G01F 1/74; G01F 9/00; G01F 11/00; G01F 13/00;
(Continued)

(56) References Cited

U.S. PATENT DOCUMENTS

| 4,201,083 A | 5/1980 | Kurita et al. |
| 4,402,230 A | 9/1983 | Raptis |

(Continued)

FOREIGN PATENT DOCUMENTS

| EP | 0 225 741 A | 6/1987 |
| EP | 1 793 109 A | 6/2007 |

(Continued)

OTHER PUBLICATIONS

Yoshiaki Kashiwaya, Hiroshi Suzuki1) and Kuniyoshi Ishii, "Gas Evolution during Mechanical Milling of Hematite—Graphite Mixture", ISIJ International, vol. 44 (2004), No. 12, pp. 1970-1974.*

(Continued)

*Primary Examiner* — John Breene
*Assistant Examiner* — Douglas Kay
(74) *Attorney, Agent, or Firm* — Haug Partners LLP

(57) ABSTRACT

A method for determining the flow rates of a fluid comprising a multi-component mixture of a gas and at least one liquid in a pipe, the method comprising the following steps: a. The temperature and pressure of the multi-component mixture is determined, b. the fractions of the multi-component mixture is determined based on at least two measured physical properties of the multi-components mixture and knowledge of the same physical property of the individual components of the multi-component mixture, c. the velocity of the multi component mixture is determined, d. based on the result from step a-c, the flow rate of the individual component of the fluid is determined, characterized by a method for determining the physical properties of at least one of the components of the multi-component mixture where e. an electromagnetic loss or phase measurement is performed, f. a statistical parameter related to the electromagnetic measurement is calculated, g. the said statistical parameter is compared to an empirical derived threshold (Continued)

value corresponding to the value of the statistical parameter when only one of the component of the multi component mixture is present, and h. the said physical properties of said fluid is determined if the statistical parameter exceeds the threshold value for the said component and used in step b-d to provide an improved value of the fractions, velocity and flow rate of the individual components of the multi-component mixture. An apparatus for performing the method is also disclosed.

11 Claims, 6 Drawing Sheets

(51) Int. Cl.
    *G01F 1/36*     (2006.01)
    *G01F 1/88*     (2006.01)
    *G01F 15/02*    (2006.01)
(58) Field of Classification Search
    CPC .......... G01F 15/00; G01F 19/00; G01F 22/00; G01N 23/12; G01N 23/06; G01N 23/08; F01F 5/00
    USPC .......................................................... 702/47
    See application file for complete search history.

(56) References Cited

U.S. PATENT DOCUMENTS

| | | | |
|---|---|---|---|
| 4,423,623 A | | 1/1984 | Ho et al. |
| 4,459,858 A | | 7/1984 | Marsh |
| 4,638,672 A | | 1/1987 | McCall |
| 4,974,452 A | | 12/1990 | Hunt et al. |
| 4,976,154 A | | 12/1990 | Schneider et al. |
| 5,103,181 A | | 4/1992 | Gaisford et al. |
| 5,135,684 A | | 8/1992 | Mohn et al. |
| 5,331,284 A | | 7/1994 | Jean et al. |
| 5,351,521 A | | 10/1994 | Cracknell |
| 5,455,516 A | | 10/1995 | Jean et al. |
| 5,576,974 A | * | 11/1996 | Marrelli ................. G01N 22/04 324/637 |
| 5,597,961 A | | 1/1997 | Marrelli |
| 5,701,083 A | | 12/1997 | Goldberg et al. |
| 5,763,794 A | * | 6/1998 | Marrelli ................. G01F 1/46 324/640 |
| 6,009,760 A | | 1/2000 | Jakkula et al. |
| 6,097,786 A | | 8/2000 | Groves et al. |
| 6,109,097 A | | 8/2000 | Conrads et al. |
| 6,332,111 B1 | | 12/2001 | Fincke |
| 6,335,959 B1 | | 1/2002 | Lynch et al. |
| 6,378,380 B1 | | 4/2002 | Kusters et al. |
| 6,405,604 B1 | | 6/2002 | Berard et al. |
| 6,614,238 B1 | | 9/2003 | Jean et al. |
| 6,755,086 B2 | | 6/2004 | Salamitou et al. |
| 6,865,522 B1 | * | 3/2005 | Gastiger ................ G05B 15/02 703/9 |
| 6,898,986 B2 | | 5/2005 | Daniel et al. |
| 6,993,979 B2 | | 2/2006 | Segeral |
| 7,562,587 B2 | * | 7/2009 | Atkinson et al. .......... 73/861.63 |
| 2002/0123669 A1 | * | 9/2002 | Wickstrom ................ 600/235 |
| 2004/0244501 A1 | * | 12/2004 | Nyfors et al. ............. 73/861.63 |
| 2007/0006640 A1 | * | 1/2007 | Gysling ..................... 73/61.44 |
| 2007/0124091 A1 | * | 5/2007 | Wee ............................. 702/49 |
| 2008/0303534 A1 | * | 12/2008 | Wee ............................. 324/639 |
| 2009/0088985 A1 | * | 4/2009 | Wee ............................. 702/30 |
| 2010/0051267 A1 | * | 3/2010 | Lowe ..................... E21B 43/122 166/250.15 |
| 2015/0316402 A1 | * | 11/2015 | Wee ........................ G01F 1/363 73/861.04 |

FOREIGN PATENT DOCUMENTS

| | | | |
|---|---|---|---|
| EP | 1 970 702 A1 | * | 9/2008 |
| GB | 2221042 A | | 1/1990 |
| NO | 324812 B1 | | 12/2007 |
| WO | WO 94/17373 A | | 8/1994 |
| WO | WO 00/45133 A | | 8/2000 |
| WO | WO 02/44664 A | | 6/2002 |
| WO | WO 02/44664 A1 | * | 6/2002 |
| WO | WO 03/034051 A | | 4/2003 |
| WO | WO 2005/057142 A | | 6/2005 |
| WO | WO 2007/084652 A | | 7/2007 |
| WO | WO 2007/129897 A | | 11/2007 |

OTHER PUBLICATIONS

Blaney, Stephen et al.: "Investigation of the exploitrtion of a fast-sampling single gamma densitometer and pattern recognition to resolve the superfidal phase velocities and liquid phase water cut of vertically upward multiphase flows", *Flow Measurement and Instrumentation*, vol. 19, Issue 2, Apr. 2008, Abstract Only.
Norwegian search report dated Jul. 8, 2009 for related Norwegian application 2008 5197.
John Amdal et al.; Handbook of Multiphase Metering; The Norwegian Society for Oil and Gas Measurement; Feb. 13, 2002; pp. 4-63. $26^{th}$ International North Sea Flow Measurement Workshop; Tuv Sud; Nel Oil & gas services; Tuv Nel Ltd, East Kilbride, Glasgow, UK; Norwegian Society for Oil and GasMeasurement; Oct. 24, 2008; 8 pages.
Sidsel Corneliussen et al., Handbook of Multiphase Flow Metering; Norwegian Society for Oil and Gas Measurement; Revision Mar. 2, 2005; pp. 1-113;Tekna.
John Amdal et al.; Handbook of Multiphase Metering; The Norwegian Society for Oil and Gas Measurement; pp. 4-63, Feb. 2002. $26^{th}$ International North Sea FlowMeasurement Workshop; Tuv Sud; Nel Oil & gas services; Tuv Nel Ltd, East Kilbride, Glasgow, UK; Norwegian Society for Oil andGasMeasurement; 8 pages, Oct. 2008.
Kjetil Folgero and Tore Tjomsland Permittivity measurement of thin liquid layers using open-ended coaxial probes; Measurement Science and Technology; 1996; vol. 7 and 8; 1164 doi.
L.F. Chen. C.K. Ong et al.; Transmission/Reflection Methods; Microwave Electronics: Measurement and Materials Characterization; 2004; pp. 175-207; John Wiley & Sons, Ltd.; England.

* cited by examiner

METHOD AND APPARATUS FOR WET GAS FLOW MEASUREMENTS AND MEASUREMENT OF GAS PROPERTIES

This application is a 371 of PCT/NO2009/000432 filed on Dec. 14, 2009, published on Jun. 17, 2010 under publication number WO 2010/068118 A which claims priority benefits from Norwegian Patent Application No. 2008 5198 filed Dec. 12, 2008, the disclosure of which is incorporated herein by reference.

FIELD OF THE INVENTION

The present invention relates to a method and apparatus for measurement of the individual components of multi-phase fluid predominantly containing a gas and the physical properties of the gas phase, as defined in the preambles of claims 1 and 22 respectively.

The problem of how to meter oil-water-gas mixtures has been of interest to the petroleum industry since the early 1980s. Since then considerable research has been conducted into the development of a three-phase flow meter suitable for use in an industrial environment.

Multiphase flow in the oil & gas industry is commonly defined as a mixture of liquids and gas where the amount of free gas, also denoted GVF, is less than 90-95% of the volume of the pipe. For GVFs in the range 95%-99.99%, the multiphase flow is often referred to as a wet gas where the liquid part is water and condensate (light oil). However, a typical wet gas wells have a GVF above 97% and it is most common with GVFs in the range 99.5-99.9%.

There are several techniques and known instruments for measuring multiphase and wet gases, as will be further described below. Such instruments need to be reasonably accurate (typically better than ±5% of rate for each phase), non-intrusive, reliable, flow regime independent and provide accurate measurements over the full component fraction range. In spite of the large number of solutions that have been proposed in recent years, no commercially available three phase wet gas flow meter yet meets all these requirements. In addition to stringent measurement requirements, the instrument needs to perform reliable in a harsh and corrosive environment such as several thousand meters below the sea surface. Inside the pipe, the flowing multiphase fluid may be traveling at a speed of 1-50 m/s with pressures in excess of 1000 bars and temperatures above 200° C. Sand is often also present and can damage the interior of the instrument.

Wet gas flow meters are increasingly used for well testing and allocation measurement.

In order to optimize the production and life of an oil/gas field, operators need to be able to regularly monitor the output of each well in the field. The conventional way of doing this is to use a test separator. Test separators are expensive, occupy valuable space on a production platform, and require a long time to monitor each well because of the stabilized flow conditions required. In addition, test separators are only moderately accurate (typically ±5 to 10% of each phase flow rate) and cannot be used for continuous well monitoring. A wet gas flow meter could be used in the first instance instead of a test separator and in the long term as a permanent installation on each well. Such an arrangement would save the loss in production normally associated with well testing. Such loss is estimated to be approximately 2% for a typical offshore installation. Allocation metering is needed when a common pipeline is used to transport the output from a number of wells owned by different companies to a processing facility. This is currently achieved by passing the output of each well through a test separator before entering the common pipeline. However, in addition to the disadvantages of the test separator described above, dedicated test pipelines to each well are also required. A permanently installed wet gas flow meter would offer significant advantages for allocation metering.

A wet gas flow meter also needs to be robust with respect to uncertainty in configuration parameters. Typical configuration parameters for commercially available wet gas meters are density, permittivity (dielectric constant), mass absorption coefficients and viscosity data for all the fluids contained in the wet gas. For wet gas flow meters where the split between liquid and gas is based on a density measurement of the wet gas and a known density values for the gas and liquid phase, the measured liquid fractions (water and oil) are highly influenced by the density value for the gas. In effect, the density value for the gas determines the zero point for the liquid fraction measurement. In most real life applications the uncertainty in the gas density may be in the order of 2-7% and change significantly over time due to compositional changes in the reservoir. This may cause significant measurement errors for the liquid parts which easily may be in the order of several hounded percent. For a typical wet gas application with an operating pressure of 150 bar, the measured mixture (wet gas) density may be 112.7 kg/m3. Assuming a gas density of 110 kg/m3 and condensate (oil) density of 650 kg/m3, the calculated GVF becomes 99.5%. I.e., 0.5% of the volume in the pipe is liquid. If on the other hand, the gas density was wrong by 5% such that the true gas density was 104.5 kg/m3 instead of 110 kg/m3, the calculated GVF then becomes 98.5% which correspond to a liquid fraction of 1.5%. For the example above, a change in the gas density of 5% causes a measurement error on the liquid fraction (and liquid flow rate) of 200%. If the measured mixture density was slightly lower (i.e. 111.35 kg/m3) the calculated GVF based on a gas density of 110 kg/m3 then becomes 99.75% corresponding to a liquid fraction of 0.25%. Again, if the gas density was wrong by 5% such that the true gas density was 104.5 kg/m3 instead of 110 kg/m3, the calculated GVF then becomes 98.75% which correspond to a liquid fraction of 1.25% causing a 400% measurement error on the liquid fraction. Consequently, the measurement uncertainty for the liquid parts related to uncertainties in the gas density increases exponentially as the gas fraction in the pipe increases.

Any error in the measured liquid fraction relates directly to a corresponding measurement error on the calculated flow rates for a wet gas meter since the flow rates is derived by multiplying the measured fractions with the velocity of the fluids in the pipe.

The formation water in the hydrocarbon reservoir is typical saline water. Under normal situations, the well should not produce any formation water. In fact, formation water in the pipeline can cause hydrate and scale formation in addition to severe pipeline corrosion. If the amount of formation and fresh water (also referred as total water fraction) in a well is known to the field operator, chemical inhibitors can be injected into the well stream in order to limit the unwanted effects due to the water. Alternatively, the production rate from the well can be changed in order to minimize or reduce the formation water production or shut down the well completely to spare the pipeline infrastructure. It is of particular interest to measure the formation and fresh water content of remotely operated subsea wells since the cost of the pipelines in such an installation is severe. It is common for most subsea installations to commingle wells into a common pipeline and transporting the multiphase fluid to a process facility. Such a process facility may be located several hounded kilometers from the seabed installation leading to long multiphase transportation pipes on the seabed. Consequently, it may take many months to detect and identify a well producing saline water without a wet gas flow meter which is able to perform accurate measurement of the produced water.

Many wet gas wells have a gas fraction (GVF) of 97-99.9% with a water fraction in the range 0.005-1%. However, there is also water present as vapor in the gas. For changing pressures and temperatures, some of the water vapor in the gas may be condensing to form liquid water. The mass of the vapor water in the pipe may be many times greater then the mass of the liquid water in the pipe. In addition the dielectric constant of vapor water is significantly higher (3-4 times) than the dielectric constant for the same mass of water as liquid phase. Consequently, the dielectric constant of a hydrocarbon mixture containing vapor water may be 10-20 times greater than the dielectric constant of a hydrocarbon mixture containing the same mass of water as liquid. Vapor water is of low importance to the operator since it does not influence scaling, waxing or corrosion of the pipelines to the same extent as saline water. However knowing the liquid water fraction and the salt content of the liquid water fraction is very important as outlined above, and hence vapor water adds to the challenge of measuring the liquid water fraction since the ratio between the amount of water as liquid and amount of water as vapor also is pressure and temperature dependent. Consequently, variations in the pressure and temperature, associated with changing flow rates or back pressure due to changing pressure drops in the transportation pipelines, can influence the dielectric constant of the hydrocarbon mixture to a much greater extent than variations in the water fraction of the multiphase mixture. The permittivity (dielectric constant) of the gas is typical a configuration constant for instruments performing measurement of the water fraction of a wet gas based on an electromagnetic measurement principle. This configuration constant can as an example be calculated based on the composition for the gas using the Clausius Mossotti equation as outlined in "*Measurement of the Liquid Water Flow Rate Using Microwave Sensors in Wet-Gas Meters—Not As Simple As You May Think*" by H.E.E VanMannen, 26$^{th}$ International North Sea Flow Measurement Workshop, 2008 [1]. From the Clausius Mosotti equation it is seen that the dielectric constant for gas is highly dependent on the density of the gas, however the amount of water vapor and the composition of the gas also has a significant impact on the permittivity of the gas such that the permittivity of the gas can not be uniquely determined based on the density of the gas. For a producing wet gas well, these parameters may also change over time without the knowledge of the field operator. Since the permittivity of the gas determines the zero point of the measurement of the water fraction, any change in temperature, pressure or composition of the gas will cause a change in the gas permittivity which again influences the zero point of the water fraction measurement making reliable measurements at low water fractions even more difficult.

In order to determine the individual fractions of a multi-component mixture of three components such as gas, water and condensate (light oil), it is sufficient to perform measurement of two independent physical properties related to the components of the mixture since the sum of the fractions is 100% and can be used as the third equation. Examples of combinations suited for measurement of fractions of a wet gas are permittivity measurement in combination with density measurement, conductivity measurement in combination with density measurement or two mass absorption measurements at two different energy levels. In order to calculate the fractions of the components (such as volume fractions), the corresponding physical properties for each of the components needs to be known. E.g., when permittivity and density measurement are used to measure the permittivity and density of a wet gas containing gas, water and condensate (light oil), the permittivity and density of the gas, water and condensate needs to be known in order to calculate the volume fractions of gas, water and condensate in the pipe.

Some examples of commercially available non-intrusive multiphase meters are shown in U.S. Pat. No. 5,103,181, U.S. Pat. No. 6,097,786, U.S. Pat. No. 5,135,684 and WO 2007/129897. A nuclear densitometer is used to measure the mixture density and the mixture density is use (directly or indirectly) to split the multiphase mixture into liquid and gas. Hence the meters are significantly influenced by any unknown changes or discrepancies in the gas density as outlined in the example above and furthermore the meters are not capable of measuring the gas density and permittivity or compensating for changes in the gas density and permittivity.

It is also well known that the composition of the multiphase mixture can be measured based on a measurement of the cut-off frequency of the pipe. Examples of such devices are found in U.S. Pat. No. 4,423,623, U.S. Pat. No. 5,455,516, U.S. Pat. No. 5,331,284, U.S. Pat. No. 6,614,238, U.S. Pat. No. 6,109,097 and U.S. Pat. No. 5,351,521, describing methods for determining the composition of a multiphase mixture based on a measurement of the cut-off frequency of a pipe based on loss or phase measurements at a varying frequency. However, all these methods are highly influenced by changes in the gas density at high gas fraction and will not provide accurate measurement of the liquid components of a wet gas.

Devices for measuring the flow rates of a multiphase fluid are well known. Such devices may be based on cross correlation of a measurement signal detecting variations in liquid and gas droplets of the flow. By transmitting a carrier signal into the flow and measuring the response, the received signal contain information of the variations in the flow caused by amplitude (loss), phase or frequency modulation by the disturbances. By performing the measurements at two sections of the pipe located at a known distance from each other, one can create two time varying signals that are shifted in time equal to the time it takes the multiphase flow to travel between the two sections. Example of such devices based on an electromagnetic carrier signal are disclosed in U.S. Pat. No. 4,402,230, U.S. Pat. No. 4,459,858, U.S. Pat. No. 4,201,083, U.S. Pat. No. 4,976,154, WO94/17373, U.S. Pat. No. 6,009,760 and U.S. Pat. No. 5,701,083

Other devises for measurement of flow rates may be based on measurement of differential pressures across a restriction in the pipe such as a venturi, orifice, v-cone or flow mixer. Examples of such devices can be found in U.S. Pat. No. 4,638,672, U.S. Pat. No. 4,974,452, U.S. Pat. No. 6,332,111, U.S. Pat. No. 6,335,959, U.S. Pat. No. 6,378,380, U.S. Pat. No. 6,755,086, U.S. Pat. No. 6,898,986, U.S. Pat. No. 6,993,979, U.S. Pat. No. 5,135,684, WO 00/45133 and WO03/034051. All these devices are subject to the same limitations as described in the example above where any error in the assumed gas density or permittivity can cause significant errors on the measured liquid flow rate.

Flow meters which uses statistical information from the flow to derive the composition of the multiphase flow is also known. One such example is found in U.S. Pat. No. 5,576, 974. Typical for such devices is that they rely too much on the statistical information to provide reliable result in any practical applications. As in U.S. Pat. No. 5,576,974 both the water fraction and the gas fraction is calculated based on microwave measurement. Statistical variation in a microwave signal passing through or reflected from a wet gas stream is related to both the droplet size, number of droplets and the amount of water in the liquid droplets. Both an increase in the amount of liquid droplets and increase in the amount of water in the liquid droplets cause an increase in the statistical variation of the microwave signal. Hence, a device such as described in U.S. Pat. No. 5,576,974 which purely relies on information from one type of sensors, will not be able to reliable discriminate between compositional changes due to change in the water/oil ratio compared to a change in the gas/liquid ratio. Any presence of liquid film in the pipe would further complicate the interpretation of the statistical information since the underlying time variance of the liquid film has a completely different frequency compared to the liquid droplets.

SUMMARY OF THE INVENTION

It is the purpose of this invention to overcome the above mentioned limitations of existing solutions.

It is the purpose of the invention to provide accurate measurements of the oil, water and gas flow rates of a wet gas.

It is the purpose of the invention to provide accurate measurement of the liquid fraction of a wet gas when the gas properties such as density and permittivity contain large uncertainty.

It is the purpose of the invention to provide accurate measurement of the liquid fraction of a wet gas when the gas properties such as density and permittivity are changing over time.

It is the purpose of this invention to provide measurement of the density of the gas in a wet gas containing liquid.

It is the purpose of this invention to provide measurement of the permittivity of the gas in a wet gas containing liquid.

It is the purpose of this invention to allow the use of simple calibration routines for a wet gas flow meter.

It is the purpose of this invention to allow the use of simple verification routines for a wet gas flow meter.

It is the purpose of this invention to provide a multiphase flow meter with high measurement accuracy at wet gas flow conditions.

It is the purpose of this invention to provide little pressure drop in the pipe of the flowing multiphase fluid.

It is the purpose of this invention to provide a non-intrusive device for performing wet gas flow measurements.

It is the purpose of this invention to allow compact installation of a wet gas flow meter.

It is the purpose of the invention to provide a compact mechanical structure for performing the measurements.

Thus, the invention as defined in claim 1 comprises a method for determining the flow rates of a fluid comprising a multi-component mixture of a gas and at least one liquid in a pipe, the method comprising the following steps:
  a. the temperature and pressure of the multi-component mixture is determined,
  b. the fractions of the multi-component mixture is determined based on at least two measured physical properties of the multi-components mixture and knowledge of the same physical property of the individual components of the multi-component mixture,
  c. the velocity of the multi component mixture is determined,
  d. based on the result from step a-c, the flow rate of the individual component of the fluid is determined, characterized by a method for determining the physical properties of at least one of the components of the multi-component mixture where
  e. an electromagnetic loss or phase measurement is performed,
  f. a statistical parameter related to the electromagnetic measurement is calculated,
  g. the said statistical parameter is compared to an empirical derived threshold value corresponding to the value of the statistical parameter when only one of the component of the multi component mixture is present, and
  h. the said physical properties of said fluid is determined if the statistical parameter exceeds the threshold value for the said component and used in step b-d to provide an, improved value of the fractions, velocity and flow rate of the individual components of the multi-component mixture.

The apparatus according to the invention is characterized by the features as defined in the independent claim 22.

Dependent claims 2-21 and 23-33 define preferred embodiments of the invention.

The invention will be further described in the following with reference to the figures, where:

DETAILED DESCRIPTION

Figure 1:
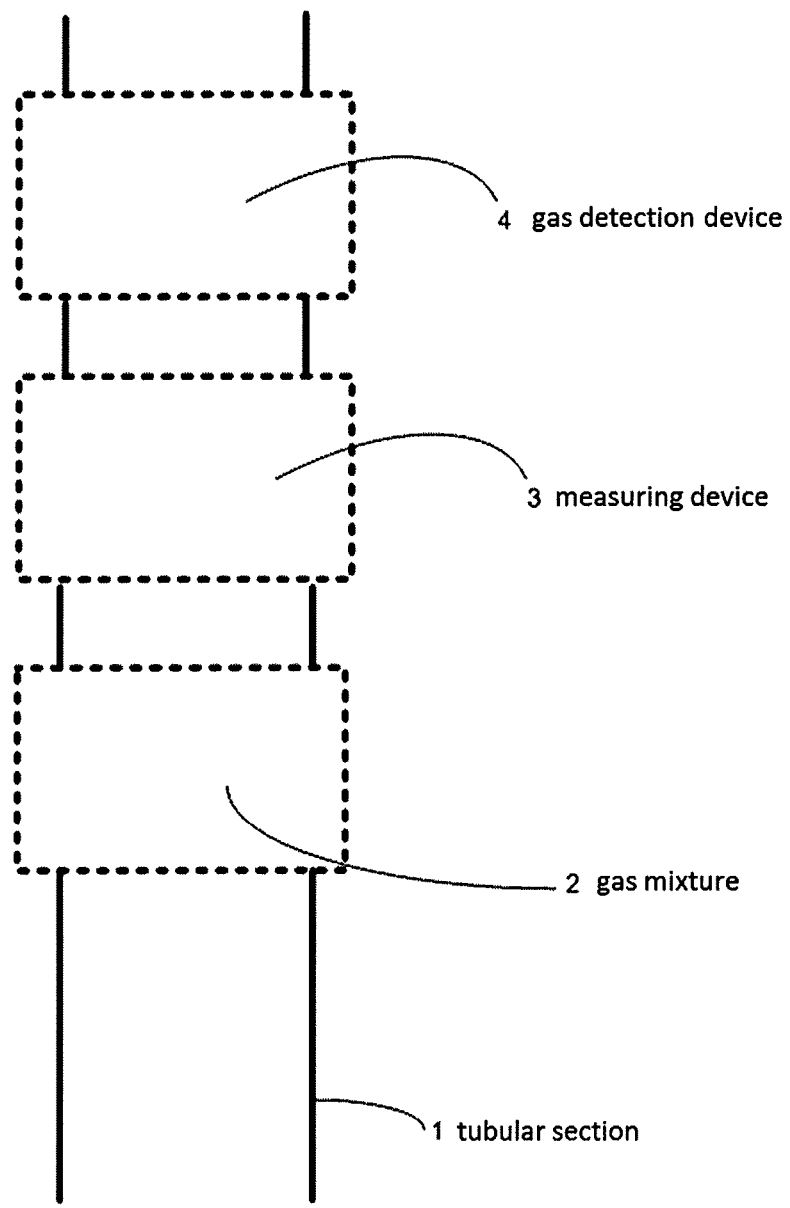
FIG. 1 shows a schematic longitudinal sectional view of the main elements of the invention.
Figure 2:
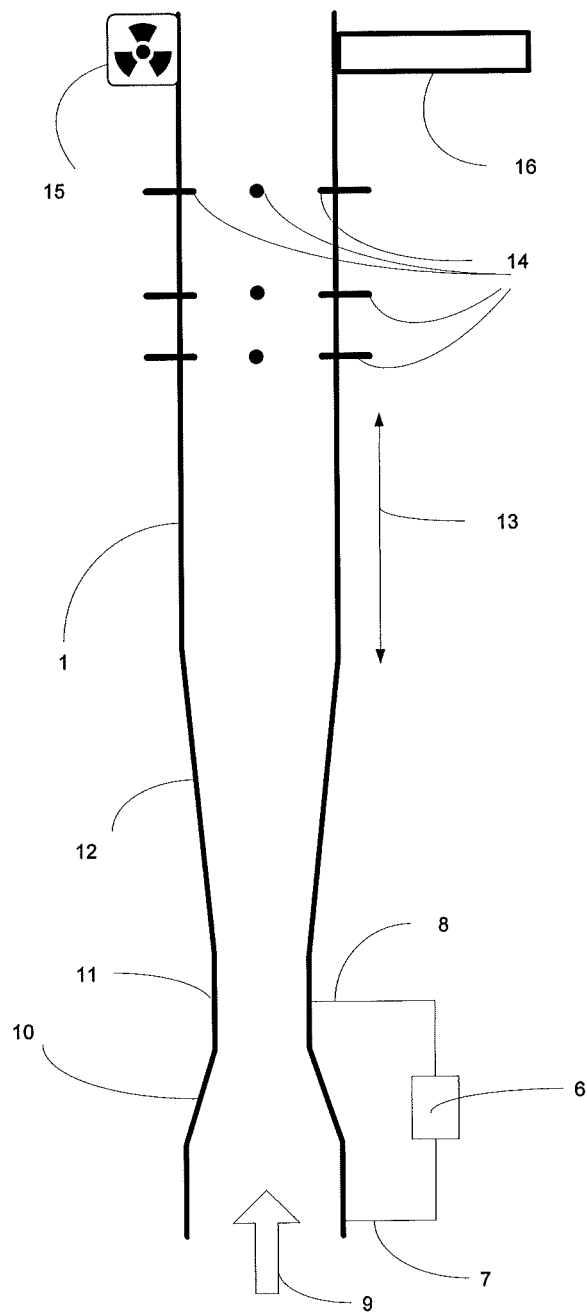
FIG. 2 shows a schematic longitudinal sectional view of an exemplifying embodiment of an apparatus for measuring the oil, water and gas fractions and flow rates according to the invention.

The present invention relates to a method and apparatus for measuring the flow rates and volume fraction of a wet gas mixture in a pipe in addition to the permittivity, density and/or mass absorption coefficient of the gas phase. The invention contains four elements as shown in FIG. 1. A tubular section 1, a device for measuring the velocity of the wet gas mixture 2, a device for measuring the gas, oil and water fraction of the wet gas mixture 3, and a device for detecting presence of pure gas in the tubular section 4. The flow direction may be either upward or downward. The device may also be located either horizontal or any other inclination, however, vertical upward and downward flow are preferred orientations. The device also contains elements for measurement of temperature and pressure for compensation purposes; however these elements are omitted from the drawings and further description for simplicity. Some of these devices can be combined together as shown in FIG. 2, where the device for measuring the fractions of gas oil and water has been combined with the device for detecting presence of pure gas in the tubular section.

A venturi can then be used as a flow device for measuring the velocity of the wet gas. The venturi consists of a convergent section 10 into a narrow passage 11 in a pipe 1. By measuring the upstream pressure 7 and the pressure in the narrow passage 8 by means of a pressure transmitter 6, the flow rate of the fluid(s) can be determined. The preferred flow direction is shown with an arrow 9.

The gas, oil and water fraction of the wet gas can be determined by combining the measurement from a gamma detector 16, which measures the gamma photons emitted by a gamma source 15, with electrical radio frequency measurements performed with the antennas 14. The antennas 14 is in effect coaxial conductors which is inserted into the pipe. The method for obtaining the fractions of the components of the wet gas using the apparatus shown in FIG. 2 is further described in NO 324812 and WO 2007/129897. However, this device needs to be configured with the density and permittivity of the oil, water and gas. In fact, any wet gas or multi phase meter needs this configuration data. One way to obtain these configuration properties is to use PVT simulation program to generate temperature and pressure dependent look-up tables for the oil, water and gas properties. For a wet gas application, the properties of the gas is of greatest importance, and in general for any multi phase flow measurement application, the properties for the largest fraction in the pipe is the most important configuration parameter in order to obtain accurate measurement of the smallest fractions of the multiphase fluid.

The properties of the gas phase are measured in time periods where the tubular section does not contain any liquids. This may typical occur if the well is slugging or pulsating such that only gas is flowing for short time periods. The tubular section may also be liquid free during shut down and start up periods of the wells. In order to detect occurrences a reliable measurement for detection of pure gas in the tubular section is required. In order to provide reliable detection, a measurement for pure gas detection needs to work completely independent of the properties of the gas, which means that a pure density, permittivity mass absorption measurement can not be used for this purpose.

The present invention uses lack of the typical characteristics of liquid in the gas which is a time varying signal related to the natural variation in the flow due to the liquid droplets and liquid film along the wall. If pure gas is flowing in the pipe, there are no variations in the signal. An empirically derived threshold value for variation in the signal can be used to define the criteria for pure gas. When pure gas is detected, the permittivity (dielectric constant), density, mass attenuation of the gas can be measured using device 3. Device 3 can be any conventional multiphase or wet gas flow meter containing sensors for measurement of the permittivity, density or mass absorption of the wet gas. However, since pure gas has been detected, the device can instead be used to measure the permittivity, density and mass absorption of the pure gas in order to correct the configuration parameters for the gas properties. One way of correcting the gas properties is to use the measured properties on pure gas to calculate correction factors to the configuration parameters. Since the gas properties is highly influenced by temperature and pressure, using the measured gas property to calculate a correction factor to the look-up table of the gas property is a convenient way to adopt the corrected gas property measurement to a larger temperature and pressure range. The correction factor method can also be extended to an even broader temperature and pressure range by using a temperature and pressure dependent look-up table for the correction factors where each temperature and pressure in the table represents a measurement at pure gas.

The method is further described below with references to the enclosed figures.

The electromagnetic measurement performed using the antennas 14 can be used to obtain a measurement of the variations of the flow related to flow of liquid droplets in the gas or flow of liquid film along the pipe wall. Presence of liquid in the wet gas will hence cause a time varying signal which can be used to derive statistical parameters such as the standard deviation of the signal. An electrical measurement which is directly scaled towards the diameter of the pipe is preferred since the droplet diameter is also related to the pipe diameter. Electrical parameters such as the waveguide cut-off frequency of a pipe, the phase or frequency characteristic of a wave which is reflected from a diameter change in the pipe (such as the divergent section of the venturi 12), the measured phase coefficient or attenuation coefficient of a propagating electromagnetic wave within the pipe or the frequency of a resonant cavity or structure within the pipe are well suited electrical parameters. In fact, any loss or phase measurements of a propagating electromagnetic wave within the pipe or the measured loss or phase from a reflected wave from the medium in the pipe can be used. The wavelength of the measurement signal should preferable be small such that the signal is able to detect small variations caused by small liquid droplets. Most devices based on measurement of cut-off frequency, frequency of a resonant cavity in the pipe and reflection characteristics or the phase or attenuation coefficient of a propagating electromagnetic wave uses signals with small wavelengths. A typical frequency range is 100-5000 Mhz depending on the pipe diameter, however larger and smaller frequencies may also be used. Examples for how most of these electrical parameters can be obtained using the apparatus shown in FIG. 2 is further described in WO 2007/129897 and WO 2005/057142, hereby incorporated by reference. The resonance frequency of a resonant cavity within the pipe can also be used as the electrical signal. An example of a device suitable for this purpose can be found in WO 03/034051. This device can also be used to measure gas, oil and water fractions of the wet gas. Capacitance and inductance sensors are also widely used to measure the fractions of multi phase fluids based on measurement of permittivity and conductivity. Electrical signals obtained from capacitance and inductance sensors may also be used, however these devices are less suited due to the low frequency and hence large wave length of the electrical signals and hence less suited to capture the small variations required for accurate liquid measurements of a wet gas which means that the device has limitations to how little liquid it is able to see in the gas compared to methods based on measurements at higher frequencies.

The procedure for determining the properties of the gas and calculating the flow rates of the individual components of the wet gas then becomes:
1) Calculate temperature and pressure look-up tables for density, permittivity, mass absorption coefficient of gas, oil and water based on the composition for the fluids.
2) Perform electrical measurement such as the phase coefficient or attenuation coefficient of a traveling electromagnetic wave in the pipe, pipe cut-off frequency or reflection frequency, phase or loss of a wave traveling through or reflected from the medium in the pipe. Examples for how to do this can be found in WO 2007/129897 and WO 2005/057142, which are incorporated herein in their entirety by reference.
3) Calculate a statistical parameter based on the time varying electrical measurement from step 1.
4) Compare the result from step 2 towards an empirical derived threshold value corresponding to pure gas in the pipe.
5) If the calculated statistical parameter from step 3 is below the threshold value from step 4, the properties of the gas is measured such as density, permittivity and mass absorption coefficient. The gas properties can be measured with the sensors of virtually any conventional multiphase or wet gas meter and examples for how to measure the this can be found in WO 2007/129897, WO 2005/057142, WO 03/034051, WO00/45133 or U.S. Pat. No. 6,405,604, which are incorporated herein in their entirety by reference.
6) Calculate correction factor to the look-up table for gas density, permittivity and mass absorption coefficient obtained in step 1 such that it matches the measured values from step 5.
7) Calculate fraction of gas, oil and water (e.g. multiphase mixture) using the corrected gas properties from step 6. in WO 2007/129897 WO 2005/057142, WO 03/034051, WO00/45133 or U.S. Pat. No. 6,405,604, which are incorporated herein in their entirety by reference.
8) Calculate the velocity of fractions in the pipe based on the measured fractions from step 7 and the measured gas properties from step 6. Examples for how to do this can be found in WO 2007/129897, WO 2005/057142, WO 03/034051, WO00/45133 or U.S. Pat. No. 6,405, 604, which are incorporated herein in their entirety by reference.

The flow device may either be a device based on measurement of pressure drop 6 such as a venturi or by using cross correlation techniques as described in WO 2007/129897 and WO 2005/057142. Other flow devices 2 based on measurement of differential pressure such as a V-cone or orifice plate and Dall Tubes may also be used. These are well known measurement principles and further information of how to use these devices can be found in *Handbook of MultiPhase Metering* issued by Norwegian Society for Oil and Gas Measurement.

In addition to the elements described above, the measurement apparatus also contains elements for performing electrical measurements and computer for performing the calculations; however it is well known how to realize the required electronics and software to perform these measurements and calculations.

Figure 3:
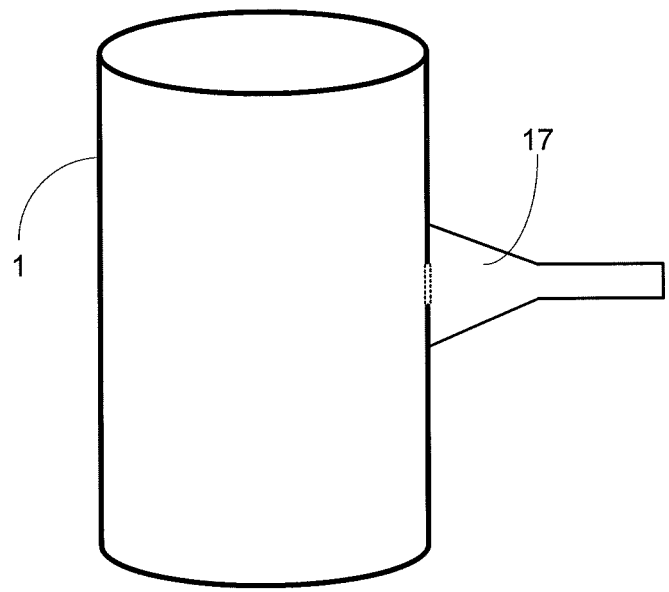
FIG. 3 shows a curve relating a statistical electrical parameter to the liquid fraction of a wet gas.
Figure 4:
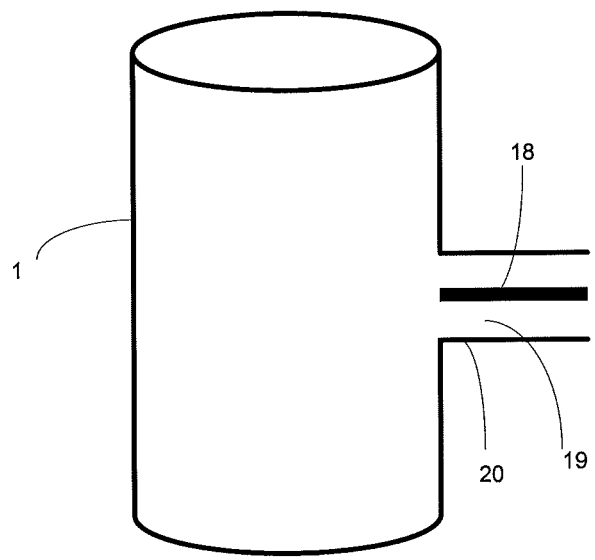
FIG. 4 shows the measured liquid fraction of a wet gas vs. a reference value as a function of time

Transmission and reflection methods are well known method for material characterization as shown in FIGS. 3 and 4. Electromagnetic methods can be based on a radiating slot 17 through the wall as shown in FIG. 3 or by using an open ended coaxial conductor 18 as shown in FIG. 4. A pulse or continuous frequency is transmitted on the coaxial cable 18. Based on a measurement of the amplitude and phase variations reflected back on the coaxial conductor, the permittivity of the material within the pipe can be determined. The design and working principles of transmission and reflection sensors as shown in FIGS. 3 and 4 is further described in "*Microwave Electronics—measurement and material characterization*" by Chen et. al., Wiley (2004), and "*Permittivity Measurements of Thin Liquid Film Layers using open-ended Coaxial Probes*", Meas. Sci. Technol., 7 (1996), 1164-1173.

Figure 6:
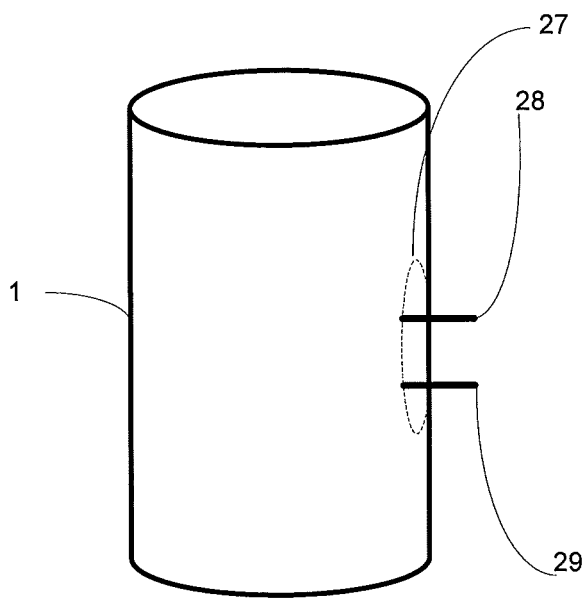
FIG. 6 shows a schematic longitudinal sectional view of an exemplifying embodiment of an apparatus for performing electromagnetic measurements according to the invention.

Two antennas as shown in FIG. 6 can also be used to perform the electromagnetic measurements. The antennas are coaxial conductors isolated by an insulating material from the pipe wall, and penetrating slightly into the pipe acting as a dipole antenna inside the pipe. The sending antenna 28 and receiving antenna 28 can also be made as a separate unit 27 which is assembled into the pipe or as to separate antennas. The antennas may also be located along the circumference of the pipe or axially along the pipe or in a combination of any axial and radial location. This device can be used to measure loss, phase of an electromagnetic wave within the medium of the pipe.

Figure 5:
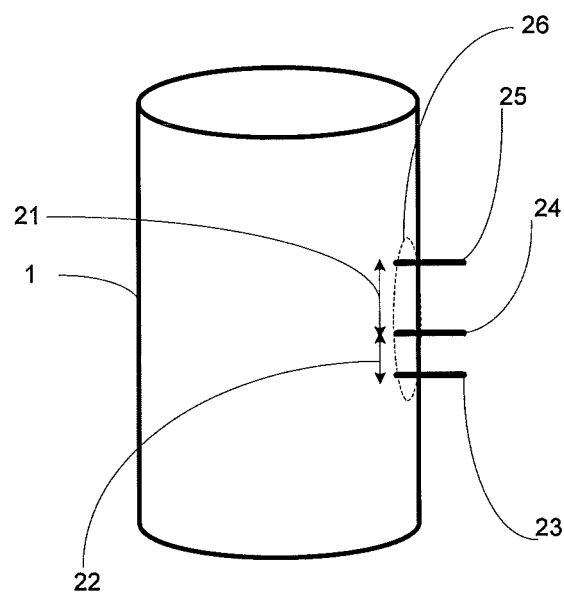
FIG. 5 shows a schematic longitudinal sectional view of an exemplifying embodiment of an apparatus for performing electromagnetic measurements according to the invention.

A similar arrangement based on three antennas for performing electromagnetic measurements are shown in FIG. 5. The antennas are coaxial conductors isolated by an insulating material from the pipe wall and penetrating slightly into the pipe acting as a dipole antenna inside the pipe. The antennas may be made as one compact probe unit 26 as shown in FIG. 5 where the transmitting antenna 24 and the two receiving antennas 25, 23 are electrical insulated from the metal housing 26 by ceramic or glass or a similar insulating material. The device can be used to measure, phase and loss of an electromagnetic wave in the pipe which also can be further extended to measure the phase coefficient and loss coefficient of an electromagnetic wave traveling within the pipe. WO 2007/129897 provides further information for how this device can be used to obtain these parameters.

The fractions and velocity of the wet gas (multi phase mixture) as outlined in step t and 8 above may be derived using any known measurement principle suited for measurement of the individual component fractions and component velocities of a wet gas (e.g. wet gas flow meters). As an example, the component fractions and velocities may mixture may be derived by using dual energy mass absorption measurements as described in U.S. Pat. No. 5,135,684 or capacitance/inductance measurement principle in combination with single energy mass absorption as described in NO 304333 or capacitance/inductance measurement principle in combination with cross correlation and venturi as shown in WO00/45133 or methods based on multiple pressure drop measurements as described in WO 02/44664. Any one of these devices can be combined with an electromagnetic measurement as described in step 2-3 above for detection of pure gas (liquid free periods) in the pipe. Example of an apparatus which can be combined with the above mentioned wet gas flow meters for detection of pure gas is shown in FIG. 3-6, however in principle any electromagnetic measurement device capable of performing electromagnetic measurements of the variance in the liquid fraction of a wet gas at higher frequencies (typical 100-5000 Mhz) can be used to obtain the statistical parameter required for gas detection.

Figure 7:
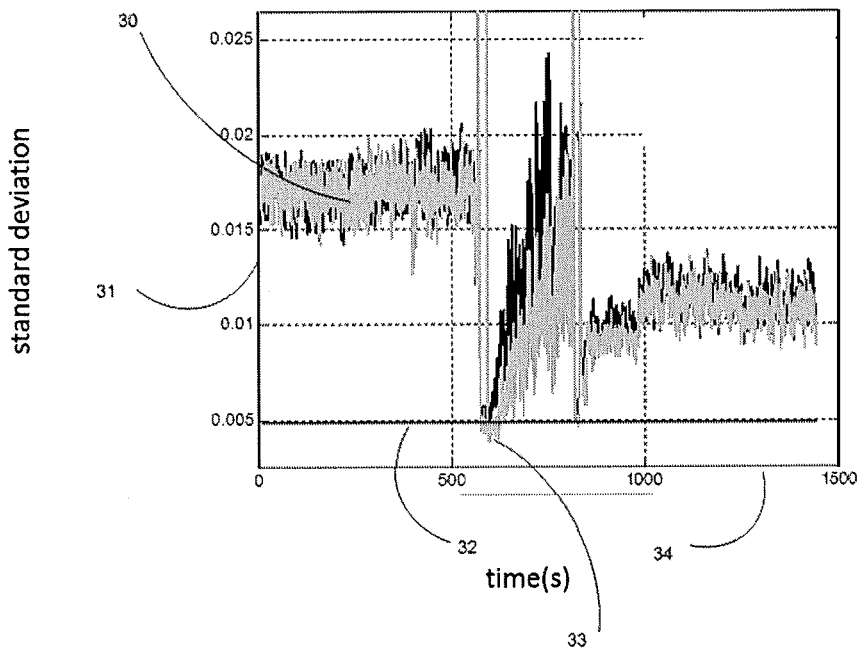
FIG. 7 shows a measurement example of a statistical parameter calculated from the electromagnetic measurement over time.
Figure 8:
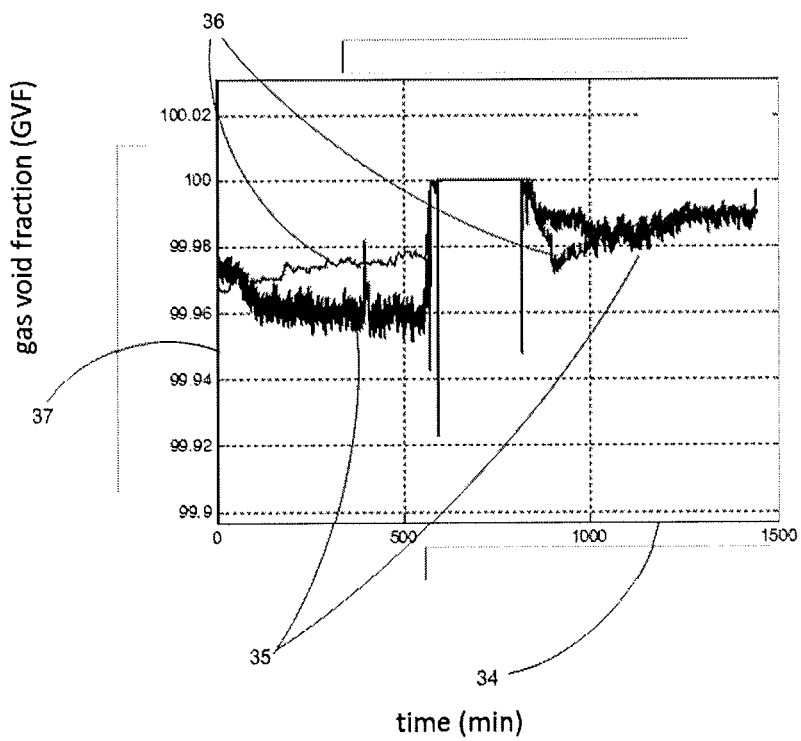
FIG. 8 shows a measurement example of the measured gas fraction of the wet gas meter compared to the reference gas fraction.
Figure 9:
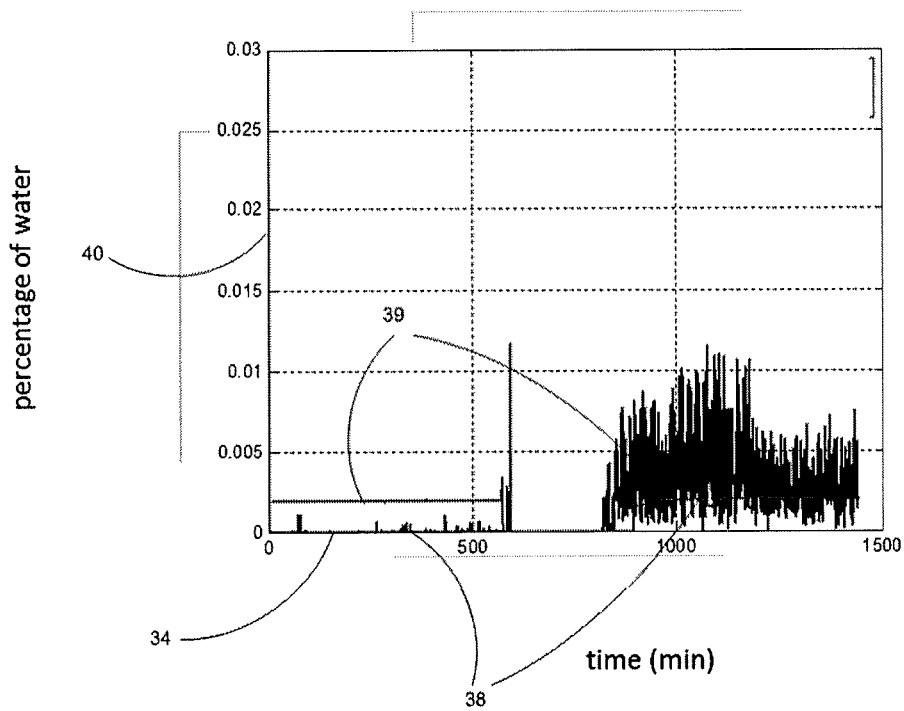
FIG. 9 shows a measurement example of the measured water fraction versus the reference water fraction.
Figure 10:
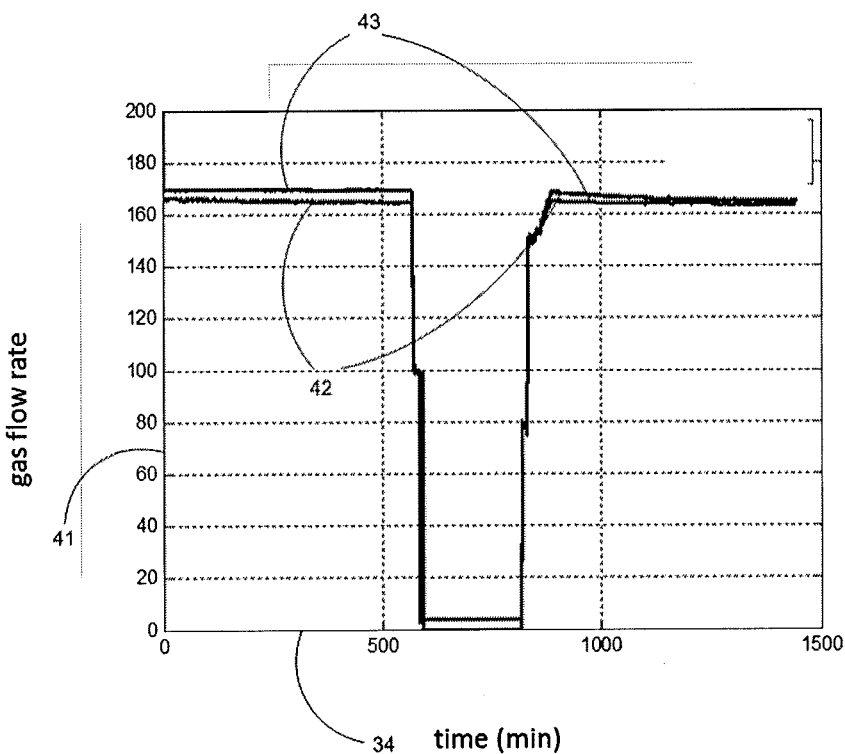
FIG. 10 shows a measurement example of the measured gas flow rate versus the reference gas flow rate.

FIG. 7-10 shows a measurement example where the gas density and gas permittivity contain an error of 5-8% error and then corrected with a measurement during a time period with pure gas in the pipe. The statistical parameter calculated from the electromagnetic measurement 30 is shown in FIG. 7 where the standard deviation of a reflected signal of an electromagnetic wave within the pipe is shown. The measurement is performed at StatoilHydro's test facility for wet gas at Kårstø and compared towards an empirical derived threshold value 32 for pure gas. The y-axis 31 shows the standard deviation and the x-axis 34 is time in seconds. For a short of approximately 20 minutes 33, pure gas is detected in the pipe. FIG. 8 shows the measured gas fraction 35 of the wet gas meter compared to the reference gas fraction 36. The x-axis 44 is time in minutes and the y-axis 37 is the gas void fraction (GVF) in the pipe. During a period of approximately 250 minutes there is a GVF close to 100% in the pipe. Consequently the statistical parameter is above the gas threshold value FIG. 10 shows the measured gas flow rate 42 versus the reference gas flow rate (measured by the test facility) for the same period. From FIG. 10 it is seen that the period with a GVF of 100% correspond to a period with no flow. From FIG. 7 it is seen that the calculated standard deviation 30 of the electrical parameter is below the gas threshold for approximately 10-20 minutes immediately after the flow rate have been shut off. During this period the gas properties (permittivity and gas density) have been measured. After approximately 10-20 minutes, condensation of liquid starts to occur due to reduction in the temperature, and hence it is not possible to perform reliable measurements of the gas properties anymore even though there is still no flow and a GVF close to 100% in the pipe. As seen from FIG. 10, there is a significant smaller difference between the reference gas flow rate 43 and measured gas flow rate 42 after the gas properties have been measured. FIG. 9 shows the impact on the measured water fraction 36 versus the reference water fraction 39. The y-axis is the percentage of water in the pipe as a percentage of the total volume of the pipe and the x-axis 34 is time in minutes. Initially, there is a 5% error in the dielectric properties of the gas (first 500 minutes) and whereas the reference water fraction 39 is approximately 0.0025%, the measured water fraction 38 is close to zero, which actually means that a negative water fraction has been calculated. However, when the permittivity of the gas has been measured during the liquid free period 33 and used for the further measurements (from approximately 800 minutes and beyond), the measured water fraction 38 is much closer to the reference water fraction 39.

The method and apparatus of the invention may also be used to derive the properties of other components of the multi-component mixture. E.g., the method can also be used to determine other physical properties of the fluid such as compressibility or mole weight by means of suitable mathematical models relating the above mention measurements to the corresponding physical quantity or by adding other sensors suitable to measuring the suited physical properties. One example of such an instrument is a gas chromatograph which is an instrument which can measure the various hydrocarbon fractions of the gas (e.g. the fractions of methane, butane, pentane etc).

The invention claimed is:

1. An apparatus for determining the flow rates of a fluid comprising a multi-component mixture of a gas and at least one liquid in a pipe, the apparatus comprising a tubular section and the following elements:
   a. means for determining the temperature and pressure of the multi-component mixture,
   b. means for measuring at least two physical properties of the multi-component mixture,
   c. means for calculating the fractions of the individual components of the multi-component mixture based on knowledge of the said physical properties of the individual components of the multi-component mixture,
   d. means for determining the velocity of the multi component mixture,
   e. means for calculating the flow rate of the individual fractions of the multi-component mixture,
   wherein the measured physical properties of at least one of the components of the multi-component mixture is measured based on:
   f. means for performing an electromagnetic loss or phase measurement,
   g. means for calculating a statistical parameter based on the electromagnetic measurement, said statistical parameter related to droplet size, number of droplets and amount of water in liquid droplets in a wet gas stream,
   h. means for comparing the statistical parameter towards an empirical determined threshold value,
   i. means for determining that said statistical parameter is below said threshold value to detect a gas only condition when only gas is naturally present in the fluid, and
   j. means for measuring a physical quantity of at least one of the components of the multi-component mixture when the statistical parameter is above said threshold value and using said physical quantity to determine an improved value of the fractions, velocity, and flow rate of the individual components of the multi-component mixture when said statistical parameter is above said threshold value.

2. An apparatus according to claim 1, comprising means for transmitting electromagnetic energy into the tubular section and recording received electromagnetic energy from the tubular section.

3. An apparatus according to claim 1, comprising means for providing electromagnetic resonances within the tubular section.

4. An apparatus according to claim 1, comprising means for transmitting electromagnetic energy into the tubular section and recording reflected electromagnetic energy from the tubular section.

5. An apparatus according to claim 1, comprising means for measuring said velocity in a narrow passage of the tubular section.

6. An apparatus according to claim 1, wherein a venturi is used to determine said velocity.

7. An apparatus according to claim 1, wherein a V-cone is used to determine said velocity.

8. An apparatus according to claim 1, comprising means for measuring said velocity by cross-correlating measurements performed in two cross-sections of the tubular sections.

9. An apparatus according to claim 1, comprising a radioactive source and photon detector for measurement of physical quantities of the multi-component mixture.

10. An apparatus according to claim 1, comprising multiple pressure drop measurements for measurement of physical quantities of the multi-component mixture.

11. An apparatus according to claim 1, comprising a combination of a pressure drop device and cross correlation velocity device for measurement of physical quantities of the multi-component mixture.

* * * * *